US009158640B2

(12) United States Patent
Alapati et al.

(10) Patent No.: US 9,158,640 B2
(45) Date of Patent: Oct. 13, 2015

(54) TIGHTLY-COUPLED CONTEXT-AWARE IRRITATOR THREAD CREATION FOR VERIFICATION OF MICROPROCESSORS

(71) Applicant: International Business Machines Corporation, Armonk, NY (US)

(72) Inventors: Sangram Alapati, Austin, TX (US); Prathiba Kumar, Udumalpet (IN); Varun Mallikarjunan, Bangalore (IN); Satish K. Sadasivam, Erode (IN)

(73) Assignee: International Business Machines Corporation, Armonk, NY (US)

( * ) Notice: Subject to any disclaimer, the term of this patent is extended or adjusted under 35 U.S.C. 154(b) by 154 days.

(21) Appl. No.: 14/069,702

(22) Filed: Nov. 1, 2013

(65) Prior Publication Data

US 2015/0127984 A1 May 7, 2015

(51) Int. Cl.
*G06F 11/26* (2006.01)
(52) U.S. Cl.
CPC ........................................ *G06F 11/26* (2013.01)
(58) Field of Classification Search
CPC . G06F 11/26; G06F 11/3632; G01R 31/3177; G01R 31/318555; G01R 31/318536; G01R 31/318572
See application file for complete search history.

(56) References Cited

U.S. PATENT DOCUMENTS

| 6,851,075 B2 | 2/2005 | Ur et al. |
| 6,944,860 B2 | 9/2005 | Schmidt |
| 7,650,259 B2* | 1/2010 | Blackmon et al. ............ 702/182 |
| 7,831,864 B1 | 11/2010 | Schoenthal et al. |
| 8,479,173 B2* | 7/2013 | Hickerson et al. ............ 717/135 |
| 2008/0082968 A1* | 4/2008 | Chang et al. .................. 717/128 |
| 2009/0125887 A1 | 5/2009 | Kahlon et al. |
| 2010/0011345 A1* | 1/2010 | Hickerson et al. ............ 717/130 |
| 2011/0214017 A1* | 9/2011 | Lupu et al. ...................... 714/16 |
| 2012/0144372 A1 | 6/2012 | Ceze et al. |

OTHER PUBLICATIONS

El-Moursy, Ali et al., "Compatible Phase Co-Scheduling on a CMP of Multi-Threaded Processors", 20th International Symposium on Parallel and Distributed Processing, IPDS 2006, 10 pages.
Zhang, Wangyuan et al., "An Analysis of Microarchitecture Vulnerability to Soft Errors on Simultaneous Multithreaded Architectures", http://www.ittc.ku.edu/~xinfu/publications/ISPASS-zhang.pdf, IEEE, 2007, pp. 169-178.

* cited by examiner

*Primary Examiner* — Nadeem Iqbal
(74) *Attorney, Agent, or Firm* — Francis Lammes; Stephen J. Walder, Jr.; Parashos T. Kalaitzis

(57) ABSTRACT

A mechanism is provided for context-aware irritation of a micro-processor. At each executed phase in a set of phases of a test case being executed on a set of micro-processors, a determination is made of a set of characteristics associated with the given executed phase of the test case. Based on the set of determined set of characteristics associated with the given executed phase, a determination is made of an irritation to be executed alongside the given executed phase of the test case. The determined irritation is then executed alongside the given executed phase of the test case.

20 Claims, 4 Drawing Sheets

TIGHTLY-COUPLED CONTEXT-AWARE IRRITATOR THREAD CREATION FOR VERIFICATION OF MICROPROCESSORS

BACKGROUND

The present application relates generally to an improved data processing apparatus and method and more specifically to mechanisms for a tightly-coupled context-aware irritator thread creation for verification of microprocessors.

Modern microprocessors have complex designs in terms of an underlying micro-architecture, such as superscalar execution, simultaneous multithreading (SMT), numerous cores packed into a single integrated circuit (IC) chip, or the like. Sharing of hardware resources in these micro-architectures occur at different levels within various micro-architectural buffers such as Level 1 (L1), Effective-to-Real-Address Translation (ERAT), Translation Lookaside Buffer (TLB), Load Miss Queue (LMQ), Load and Store reorder queues, issue queues, or the like, as well as in various execution unit areas shared among all threads of a same core. Generally, at the IC chip level, Level 2 (L2) and Level 3 (L3) caches tend to be dynamically shared among different cores on a same IC chip. There is also a complex coherency protocol to manage data integrity across accesses from multiple cores and across multiple chips.

SUMMARY

In one illustrative embodiment, a method, in a data processing system, is provided for context-aware irritation of a micro-processor. At each executed phase in a set of phases of a test case being executed on a set of micro-processors, the illustrative embodiment determines a set of characteristics associated with the given executed phase of the test case. The illustrative embodiments determines an irritation to be executed alongside the given executed phase of the test case based on the set of determined set of characteristics associated with the given executed phase. The illustrative embodiment executes the determined irritation alongside the given executed phase of the test case.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

As discussed above, sharing of hardware resources in micro-architectures occur at different levels within various micro-architectural buffers. Therefore, a significant amount of hardware that tracks the usage and allocation of these shared resources needs to be validated thoroughly. Further, these shared resources have multiple ports catering to accesses coming from different hardware threads. There are also different banks in the shared cache resources to effectively interleave addresses. Similarly, within the core, there are interesting scenarios where there are chances for thread starvation due to an asymmetrical demand pattern or different threads. That is, superscalar Simultaneous multithreading (SMT) processors typically employ complex hang detection and buster mechanisms that guarantee forward progress for stalled threads. Such starvation may also happen at the shared resources due to bank and congruence class collisions due to partially similar addresses coming from different cores.

Existing functional test generation tools mainly concentrate on generating single-threaded test cases with very limited coverage for multithreaded test cases. Such tools never fully stress the underlying hang detection hardware due to lack of threads that perform directed irritation to lock out other test case threads to effectively validate the hang detection and buster logic. While there are some random irritation techniques, such techniques are limited in their ability to perform targeted irritation of test case threads due to their inherent randomness due to which they cannot create same level of stress on shared resources since they are not directed and context aware.

Thus, the mechanisms of the illustrative embodiments provide for a tightly-coupled context-aware irritation that analyzes test case characteristics. The mechanisms of the illustrative embodiments utilize these test case characteristics to perform targeted irritation of the test case threads. That is, the illustrative embodiments leverage the use of shared memory to communicate between the implemented test case and irritation threads across chips as well as shared core registers for communication between the implemented test case and irritation threads in the same core.

Figure 1:
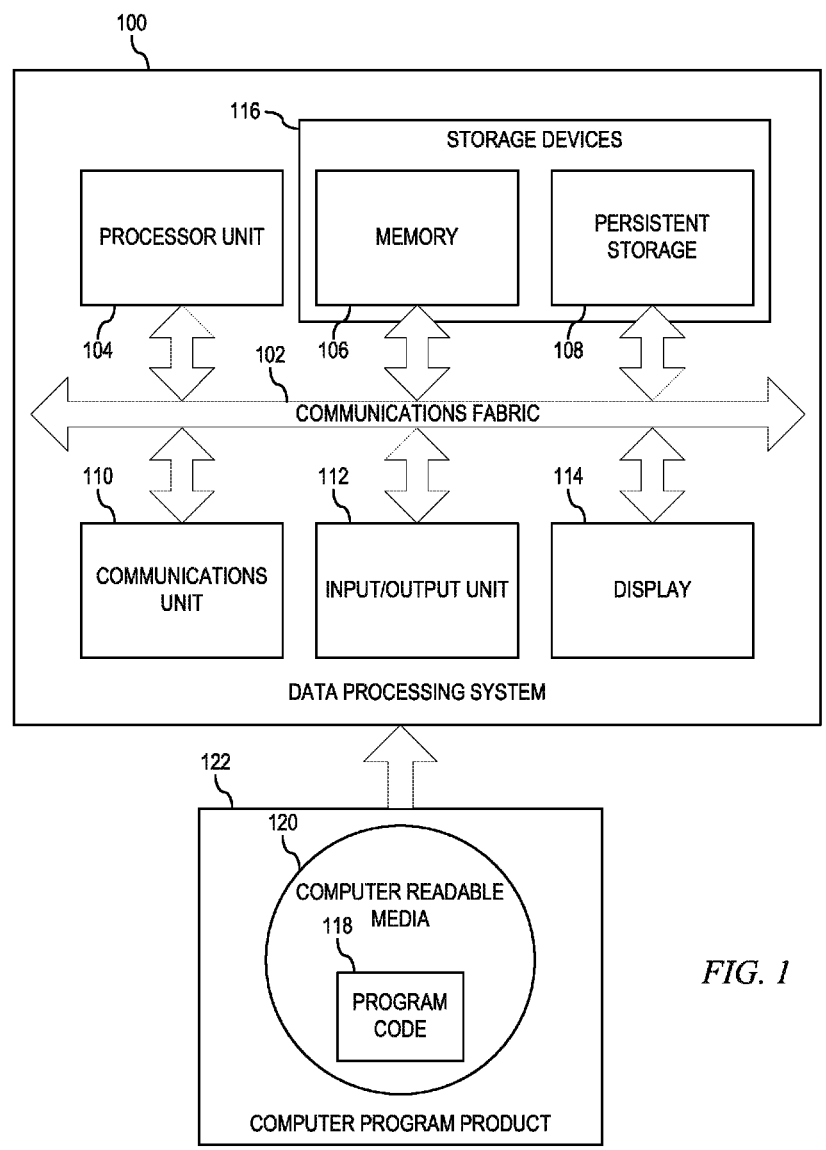
FIG. 1 depicts a block diagram of a data processing system in which illustrative embodiments may be implemented.

Thus, the illustrative embodiments may be utilized in many different types of data processing environments. In order to provide a context for the description of the specific elements and functionality of the illustrative embodiments, FIG. 1 is provided hereafter as example environment in which aspects of the illustrative embodiments may be implemented. It should be appreciated that FIG. 1 is only an example and is not intended to assert or imply any limitation with regard to the environments in which aspects or embodiments of the present invention may be implemented. Many modifications to the depicted environments may be made without departing from the spirit and scope of the present invention.

FIG. 1 depicts a block diagram of a data processing system in which illustrative embodiments may be implemented. Data processing system 100 is an example of a computer, in which computer usable program code or instructions implementing the processes may be located for the illustrative embodiments. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices 116. A storage device is any piece of hardware that is capable of storing information, such as, for example, without limitation, data, program code in functional form, and/or other suitable information either on a temporary basis and/or a permanent basis. Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard, a mouse, and/or some other suitable input device. Further, input/output unit 112 may send output to a printer. Display 114 provides a mechanism to display information to a user.

Instructions for the operating system, applications and/or programs may be located in storage devices 116, which are in communication with processor unit 104 through communications fabric 102. In these illustrative examples the instructions are in a functional form on persistent storage 108. These instructions may be loaded into memory 106 for execution by processor unit 104. The processes of the different embodiments may be performed by processor unit 104 using computer implemented instructions, which may be located in a memory, such as memory 106.

These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 118 is located in a functional form on computer readable media 120 that is selectively removable and may be loaded onto or transferred to data processing system 100 for execution by processor unit 104. Program code 118 and computer readable media 120 form computer program product 122 in these examples. In one example, computer readable media 120 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 120 also may take the form of a persistent storage, such as a hard drive, a thumb drive, or a flash memory that is connected to data processing system 100. The tangible form of computer readable media 120 is also referred to as computer recordable storage media. In some instances, computer readable media 120 may not be removable.

Alternatively, program code 118 may be transferred to data processing system 100 from computer readable media 120 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

In some illustrative embodiments, program code 118 may be downloaded over a network to persistent storage 108 from another device or data processing system for use within data processing system 100. For instance, program code stored in a computer readable storage medium in a server data processing system may be downloaded over a network from the server to data processing system 100. The data processing system providing program code 118 may be a server computer, a client computer, or some other device capable of storing and transmitting program code 118.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 100 is any hardware apparatus that may store data. Memory 106, persistent storage 108 and computer readable media 120 are examples of storage devices in a tangible form. In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

Figure 2:
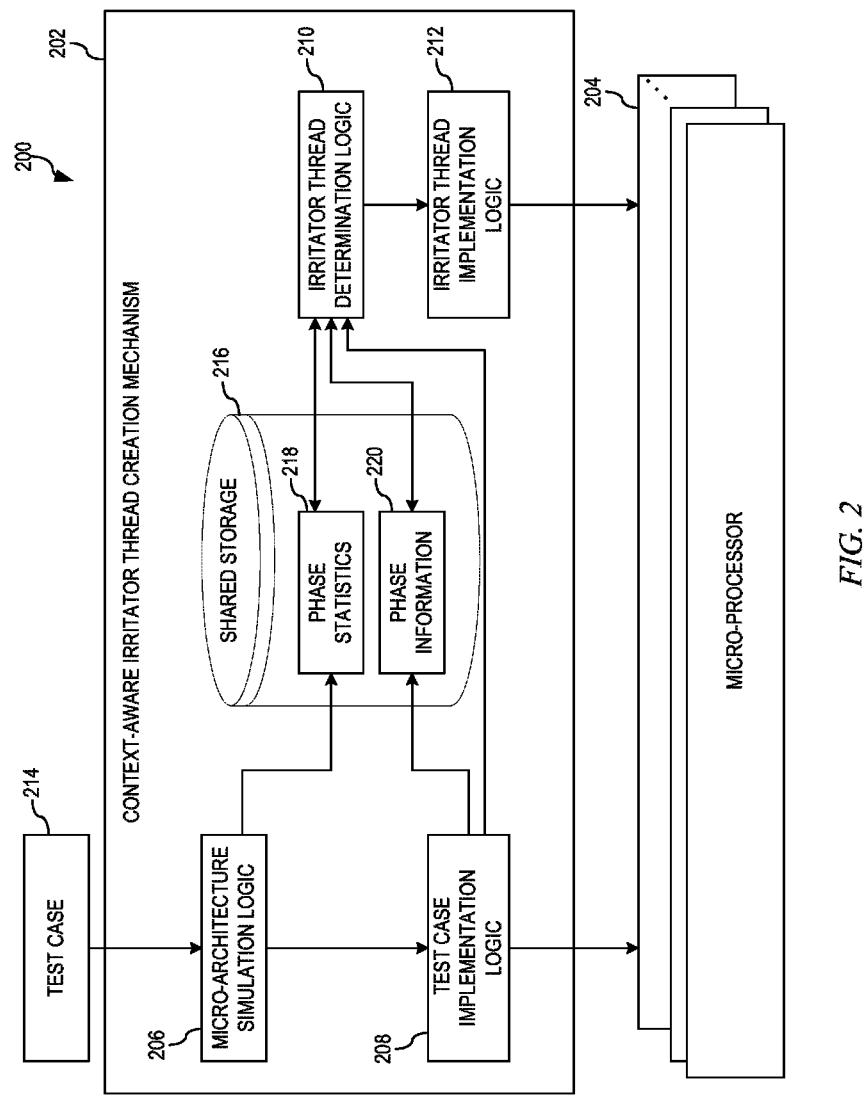
FIG. 2 depicts a context-aware irritator thread creation mechanism in accordance with an illustrative embodiment.

In order to verify the operation of microprocessors, such as processing unit 104 of FIG. 1, the illustrative embodiment provide for a tightly-coupled context-aware irritator thread creation. Thus, FIG. 2 depicts a context-aware irritator thread creation mechanism in accordance with an illustrative embodiment. Data processing system 200 comprises context-aware irritator thread creation mechanism 202 and one or more microprocessors 204. Context-aware irritator thread creation mechanism 202 further comprises micro-architecture simulation logic 206, test case implementation logic 208, irritator thread determination logic 210, and irritator thread implementation logic 212.

In operation, context-aware irritator thread creation mechanism 202 receives test case 214 to be implemented on one or more of microprocessors 204. Upon receiving test cases 214, micro-architecture simulation logic 206 performs a cycle-accurate mimic of an execution of test case 214 on the target platform in order to obtain information associated with test case 214, such as cache hits/misses, instruction mix, Load Miss Queue (LMQ)/issue queue/Effective-to-Real-Address Translation (ERAT)/Translation Lookaside Buffer (TLB) cache occupancy, Local/Global Branch History Table (BHT) accesses, execution unit usage, memory access addresses, or the like. Further, based on this information, micro-architecture simulation logic 206 identifies one or more distinct phases of test case 214 with each distinct phase have one or more particular characteristics. With the one or more distinct phases identified, micro-architecture simulation logic 206 augments test case 214 with "communication" instructions that identify a start and an end of each distinct phase in the one or more distinct phases. The "communication" instructions may be in the form of an interrupt that is initiated by the test case both at the beginning and at the end of a distinct phase, by updating a shared variable both at the beginning and at the end of a distinct phase where this shared variable is polled by irritator thread determination logic 210, or the like. The "communication" instructions may also include an address region where the current phase of test case is being implemented in order for the executed irritation to accurately target the address regions where the test case is operating.

Furthermore, micro-architecture simulation logic 206 loads the particular characteristics associated with each distinct phase of test case 214 into phase statistics data structure 218 of shared storage 216. Since the context-aware irritation provided by context-aware irritator thread creation mechanism 202 involves cache, irritation, TLB irritation, or the like, irritator thread determination logic 210 utilizes the access types and the associated address regions identified in phase statistics data structure 218, to determine an appropriate irritation for the corresponding distinct phase. Once micro-architecture simulation logic 206 augments test case 214 with "communication" instructions and loads the information associated with the distinct phases into phase statistics data structure 218, micro-architecture simulation logic 206 initiates test case implementation logic 208 and irritator thread determination logic 210.

Upon initiation from micro-architecture simulation logic 206, test case implementation logic 208 begins implementation of augmented test case 214 on one or more of microprocessors 204. As test case implementation logic 208 implements augmented test case 214, upon encountering a first communication instruction, test case implementation logic 208 either sends an interrupt indicating the current phase directly to irritator thread determination logic 210 or updates a shared variable indicating the current phase in phase information data structure 220 within shared storage 216.

Upon receiving the interrupt from test case implementation logic 208 or polling phase information data structure 220, irritator thread determination logic 210 utilizes the indicated current phase information to identify characteristics associated with the current phase from phase statistics data structure 218. Utilizing the identified characteristics associated with the current phase, irritator thread determination logic 210 determines an irritation to be executed. The irritation may be, for example:

LMQ flood→Issuing continuous load accesses to random addresses. This has a direct impact on the test case thread since, in SMT2 and higher modes, LMQ entries are dynamically shared among threads.

BHT alias→Putting branches at effective addresses that alias into the same BHT entries as test case branches. This may cause more mis-predictions for test case branches and stall the execution pipes.

Cache conflict→Issuing accesses to addresses (that may be same as test case addresses or addresses that map to same congruence class as test case accesses) to increase bank conflicts and cast outs. Some of the accesses may be from irritators running on remote cores/chips that can pull test case cache lines to remote nodes causing interesting cache states in the L2 or L3 caches of the core running the test case.

TLB/ERAT cleaner/roller→Issuing constant TLB entry kill operations to test case address mappings to increase TLB miss rates leading to flooding of page table walk logic. Irritator threads may even access continuous random effective segments causing ERAT and TLB overflows.

Cache sweeper→Performing data cache block flush (dcbf) that keep continuously kicking test case cache lines out of the L2 cache and into main memory which irritates the test case by causing constant cache misses.

Prefetch irritation→Issuing carefully coded accesses (could be load, load word and reserve indexed (lwarx), store, or the like, accesses) to locations around the test case locations with or without strides to cause L2 prefetch flood scenarios.

Issue queue flood→Using the instruction mix information to call libraries that continuously execute operations that go to the same queue side as the execution units of the test case threads.

Interrupt irritation→Using "special characteristics" of the test case thread to build irritator threads that get constant interrupts (could be data storage (synchronous), external interrupts (asynchronous), decrementer (asynchronous), or the like).

After determining a proper irritation to be executed based on the current phase and its characteristics, irritator thread implementation logic 212 implements the irritation on one or more of microprocessors 204. Irritator thread determination logic 210 then monitors for another interrupt from test case implementation logic 208 and/or monitors phase information data structure 220 for an updated shared variable indicating a change in phase.

As test case implementation logic 208 continues to implement augmented test case 214, upon encountering a subsequent communication instruction, test case implementation logic 208 either sends an interrupt indicating a change to the current phase directly to irritator thread determination logic 210 or updates a shared variable indicating the change to the current phase in phase information data structure 220 within shared storage 216. Both the interrupt or the update of the shared variable may be a single indication to indicate a transition to a next phase or may comprise a set of interrupts or a set of updates to the shared variable that indicate an end to a current phase and a start of a next phase.

Upon detecting either of these indications, irritator thread determination logic 210 utilizes the indicated phase information to identify characteristics associated with the phase from phase statistics data structure 218. Utilizing the identified characteristics associated with the phase, irritator thread determination logic 210 determines an irritation to be executed, irritator thread implementation logic 212 implements the irritation on one or more of microprocessors 204, and irritator thread determination logic 210 monitors for a next change in phase.

Finally, once test case implementation logic 208 completes the last phase of augmented test case 214, test case implementation logic 208 either sends a final interrupt indicating an end to the implementation of augmented test case 214 or updates a shared variable indicating an end to the implementation of augmented test case 214 in phase information data structure 220 within shared storage 216. Upon detecting either of these indications, irritator thread determination logic 210 and irritator thread implementation logic 212 cease implementing any additional irritations on one or more of microprocessors 204.

In accordance with the illustrative embodiments, test case implementation logic 208 and irritator thread implementation logic 212 may both utilize a scheduling mechanism that maps test cases and irritations to actual hardware threads in order to pair an irritation with the associated test case, such that the irritation and the test case are placed in the same core and fall into the same thread set so that the irritation and the test case internally use the same issue queue, execution pipeline, and exception processing pipeline.

In accordance with another illustrative embodiment, instead of running test case 214 through micro-architecture simulation logic 206, test case implementation logic 208 may directly implement test case 214 and utilize performance monitoring counters and instrumentation hardware to collect various statistics that may be stored in phase statistics data structure 218. By gathering such statistics directly rather than through simulation, context-aware irritator thread creation mechanism 202 may improve a speed of test case implementation logic 208 to cater the needs of post-silicon validation.

In accordance with yet another illustrative embodiment, test case implementation logic 208 may repeat a current phase of test case 214 or the entire test case 214 and irritator thread implementation logic 212 may generate and execute a different irritation each time test case implementation logic 208 repeats execution of the current phase of test case 214. Thus, irritator thread determination logic 210 and irritator thread implementation logic 212 determines, generates, and executes an irritation to execute concurrently with the each given phase in a set of phases of test case 214.

The above aspects and advantages of the illustrative embodiments of the present invention will be described in greater detail hereafter with reference to the accompanying figures. It should be appreciated that the figures are only intended to be illustrative of exemplary embodiments of the present invention. The present invention may encompass aspects, embodiments, and modifications to the depicted exemplary embodiments not explicitly shown in the figures but would be readily apparent to those of ordinary skill in the art in view of the present description of the illustrative embodiments.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium is a system, apparatus, or device of an electronic, magnetic, optical, electromagnetic, or semiconductor nature, any suitable combination of the foregoing, or equivalents thereof. More specific examples (a non-exhaustive list) of the computer readable storage medium would include the following: an electrical device having a storage capability, a portable computer diskette, a hard disk, a random access memory (RAM), a read-only memory (ROM), an erasable programmable read-only memory (EPROM or Flash memory), an optical fiber based device, a portable compact disc read-only memory (CDROM), an optical storage device, a magnetic storage device, or any suitable combination of the foregoing. In the context of this document, a computer readable storage medium is any tangible medium that can contain or store a program for use by, or in connection with, an instruction execution system, apparatus, or device.

In some illustrative embodiments, the computer readable medium is a non-transitory computer readable medium. A non-transitory computer readable medium is any medium that is not a disembodied signal or propagation wave, i.e. pure signal or propagation wave per se. A non-transitory computer readable medium may utilize signals and propagation waves, but is not the signal or propagation wave itself. Thus, for example, various forms of memory devices, and other types of systems, devices, or apparatus, that utilize signals in any way, such as, for example, to maintain their state, may be considered to be non-transitory computer readable media within the scope of the present description.

A computer readable signal medium, on the other hand, may include a propagated data signal with computer readable program code embodied therein, for example, in a baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Similarly, a computer readable storage medium is any computer readable medium that is not a computer readable signal medium.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 3:
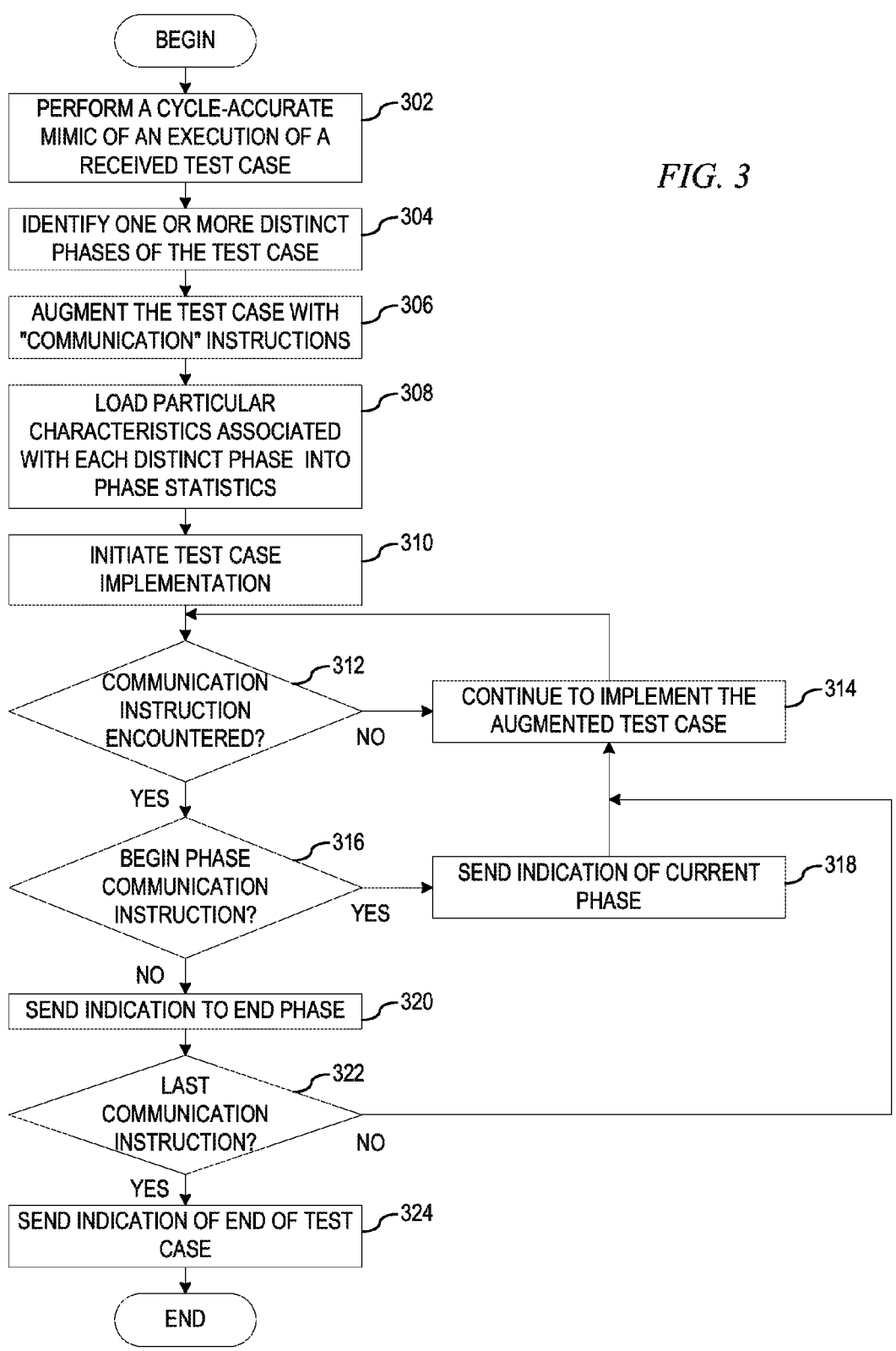
FIG. 3 depicts a flowchart of the operation performed by a context-aware irritator thread creation mechanism in execution of a test case sequence in accordance with an illustrative embodiment.

FIG. 3 depicts a flowchart of the operation performed by a context-aware irritator thread creation mechanism in execution of a test case sequence in accordance with an illustrative embodiment. As the operation begins, the context-aware irritator thread creation mechanism performs a cycle-accurate mimic of an execution of a received test case on a simulation of a target platform in order to obtain information associated with the test case (step 302). Based on this information, the context-aware irritator thread creation mechanism identifies one or more distinct phases of the test case with each distinct phase having one or more particular characteristics (step 304). With the one or more distinct phases identified, the context-aware irritator thread creation mechanism augments the test case with "communication" instructions that identify a start and an end of each distinct phase in the one or more distinct phases (step 306). Furthermore, the context-aware irritator thread creation mechanism loads the particular characteristics associated with each distinct phase of the test case into a phase statistics data structure of a shared storage (step 308).

The context-aware irritator thread creation mechanism then initiates a test case implementation mechanism to begin implementation of the augmented test case on one or more of microprocessors (step 310). As the context-aware irritator thread creation mechanism implements the augmented test case, the context-aware irritator thread creation mechanism determines whether a communication instruction has been encountered (step 312). If at step 312 a communication instruction has not been encountered, the context-aware irritator thread creation mechanism continues to implement the augmented test case (step 314), with the operation retuning to step 312. If at step 312 a communication instruction has been encountered, the context-aware irritator thread creation mechanism determines whether the communication instruction is a begin phase communication instruction or an end phase communication instruction (step 316). If at step 316 the communication instruction is a begin phase communication instruction, then the context-aware irritator thread creation mechanism either sends an interrupt indicating the current phase directly to irritator thread determination logic or updates a shared variable indicating the current phase in a phase information data structure within the shared storage (step 318) with the operation proceeding to step 314.

If at step 316 the communication instruction is an end phase communication instruction, the context-aware irritator thread creation mechanism sends an interrupt indicating the end of the current phase directly to irritator thread determination logic or updates a shared variable indicating the end to the current phase in a phase information data structure within the shared storage (step 320). The context-aware irritator thread creation mechanism then determines whether the end phase communication instruction is the last communication instruction in the augmented test case (step 322). If at step 322 the end phase communication instruction fails to be the last communication instruction in the augmented test case, the operation returns to step 314. If at step 322 the end phase communication instruction is the last communication instruction in the augmented test case, the context-aware irritator thread creation mechanism sends an interrupt indicating the end of the test case directly to irritator thread determination logic or updates a shared variable indicating the end of the test case in the phase information data structure within the shared storage (step 324), with the operation terminating thereafter.

Figure 4:
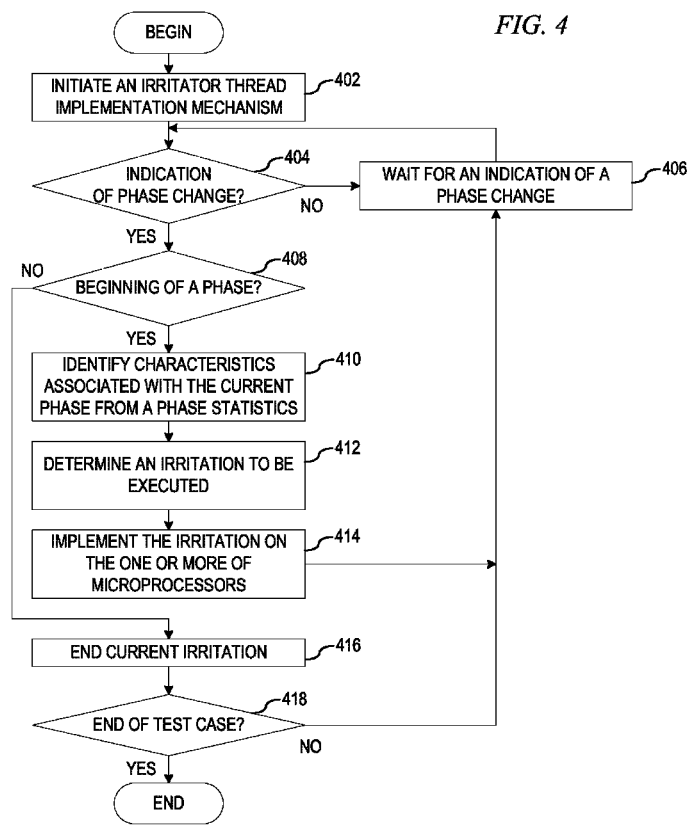
FIG. 4 depicts a flowchart of the operation performed by a context-aware irritator thread creation mechanism in execution of an irritator sequence in accordance with an illustrative embodiment.

FIG. 4 depicts a flowchart of the operation performed by a context-aware irritator thread creation mechanism in execution of an irritator sequence in accordance with an illustrative embodiment. As the operation begins, the context-aware irritator thread creation mechanism initiates an irritator thread implementation mechanism to begin implementation of one or more irritator threads on one or more of microprocessors (step 402). The context-aware irritator thread creation mechanism then determines whether an interrupt has been received or a shared variable in a phase information data structure has been updated (step 404). If at step 404 an interrupt has not been received or a shared variable in the phase information data structure has not been updated, then the context-aware irritator thread creation mechanism waits for an indication of a phase change (step 406), with the operation returning to step 404.

If at step 404 an interrupt has been received or a shared variable in the phase information data structure has been updated, the context-aware irritator thread creation mechanism determines whether the interrupt or shared variable indicate a beginning of a phase or an ending of a phase (step 408). If at step 408 the interrupt or shared variable indicates a beginning of a phase, the context-aware irritator thread creation mechanism utilizes the indicated current phase information to identify characteristics associated with the current phase from a phase statistics data structure (step 410). Utilizing the identified characteristics associated with the current phase, the context-aware irritator thread creation mechanism determines an irritation to be executed (step 412). After determining a proper irritation to be executed based on the current phase and its characteristics, the context-aware irritator thread creation mechanism implements the irritation on the one or more of microprocessors (step 414) with the operation returning to step 406.

If at step 408 the interrupt or shared variable indicates an ending of a phase, the context-aware irritator thread creation mechanism ends the current irritation (step 416). The context-aware irritator thread creation mechanism further determines whether another interrupt or an updated shared variable indicates an end of the test case (step 418). If at step 418 no such interrupt is received or the shared variable is not updated to indicate the end of the test case, the operation proceeds to step 406. If at step 418 an interrupt is received or the shared variable is updated to indicate the end of the test case, then the operation terminates thereafter.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for a tightly-coupled context-aware irritation that analyzes test case characteristics. The mechanisms utilize these test case characteristics to perform targeted irritation of the test case threads. That is, the mechanisms leverage the use of shared memory to communicate between the implemented test case and irritation threads across chips as well as shared core registers for communication between the implemented test case and irritation threads in the same core.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for context-aware irritation of a micro-processor, the method comprising:
    at each executed phase in a set of phases of a test case being executed on a set of micro-processors, determining a set of characteristics associated with the given executed phase of the test case;
    based on the set of determined set of characteristics associated with the given executed phase, determining an irritation to be executed alongside the given executed phase of the test case; and
    executing the determined irritation alongside the given executed phase of the test case.

2. The method of claim 1, wherein a change in each phase in the set of phases is communicated by a test case implementation mechanism that is implementing the test case.

3. The method of claim 2, wherein the change in each phase in the set of phases comprises both an end of a current phase and either a beginning of a next phase or an indication of the end of the test case.

4. The method of claim 2, wherein the change in each phase in the set of phases is indicated by at least one of an interrupt or an update of a shared variable.

5. The method of claim 1, wherein the set of characteristics associated with each phase in the set of phases associated with the test case is determined by the method comprising:
    either:
        performing a cycle-accurate mimic of the execution of the test case in a simulated environment and identifying information associated with the cycle-accurate mimic of the execution of the test case to identify one or more set of distinct phases of the execution; or
        executing the test case on hardware and identifying the one or more set of distinct phases of the execution of the test case by recording characteristics from performance monitoring counters on the hardware; and
    identifying characteristics associated with each phase of the one or more distinct phases thereby determining the set of characteristics associated with each phase in the set of phases.

6. The method of claim 5, wherein the test case is augmented with a set of communication instructions based on the identified one or more distinction phases and where the set of communication instructions provide the indication of changes in the set of phases to an irritator thread implementation mechanism implementing the determined irritation.

7. The method of claim 1, wherein the determined irritation and the given executed phase of the test case are executed in a same core of the micro-processor.

8. The method of claim 1, wherein the determined irritation and the given executed phase of the test case are executed on a same thread set of a same chip or a same core, wherein executing the determined irritation and the given executed phase of the test case causes the determined irritation and the given executed phase of the test case to utilize at least one of a same issue queue, a same execution pipeline, or a same exception processing pipeline.

9. The method of claim 1, wherein the determined irritation and the given executed phase of the test case are executed on different cores, wherein executing the determined irritation on a different core causes cache lines associated with the given executed phase of the test case to be pulled to the different core than the core where the given executed phase of the test case is executing.

10. The method of claim 1, wherein the determined irritation is generated and executed concurrently with the execution of the given executed phase of the test case.

11. The method of claim 1, wherein the determined irritation changes with each phase in the set of phases based on the set of characteristics associated with each phase in the set of phases.

12. The method of claim 1, wherein the executed phase in the set of phases is repeated a predetermined number of times or the test case as a whole is itself repeated a predetermined number of times and wherein a different irritation is executed each time the executed phase is repeated.

13. A computer program product comprising a computer readable storage medium having a computer readable program stored therein, wherein the computer readable program, when executed on a computing device, causes the computing device to:
   at each executed phase in a set of phases of a test case being executed on a set of micro-processors, determine a set of characteristics associated with the given executed phase of the test case;
   based on the set of determined set of characteristics associated with the given executed phase, determine an irritation to be executed alongside the given executed phase of the test case; and
   execute the determined irritation alongside the given executed phase of the test case.

14. The computer program product of claim 13, wherein a change in each phase in the set of phases is communicated by a test case implementation mechanism that is implementing the test case.

15. The computer program product of claim 14, wherein the change in each phase in the set of phases comprises both an end of a current phase and either a beginning of a next phase or an indication of the end of the test case.

16. The computer program product of claim 14, wherein the change in each phase in the set of phases is indicated by at least one of an interrupt or an update of a shared variable.

17. An apparatus comprising:
   a processor; and
   a memory coupled to the processor, wherein the memory comprises instructions which, when executed by the processor, cause the processor to:
   at each executed phase in a set of phases of a test case being executed on a set of micro-processors, determine a set of characteristics associated with the given executed phase of the test case;
   based on the set of determined set of characteristics associated with the given executed phase, determine an irritation to be executed alongside the given executed phase of the test case; and
   execute the determined irritation alongside the given executed phase of the test case.

18. The apparatus of claim 17, wherein a change in each phase in the set of phases is communicated by a test case implementation mechanism that is implementing the test case.

19. The apparatus of claim 18, wherein the change in each phase in the set of phases comprises both an end of a current phase and either a beginning of a next phase or an indication of the end of the test case.

20. The apparatus of claim 18, wherein the change in each phase in the set of phases is indicated by at least one of an interrupt or an update of a shared variable.

* * * * *